Dec. 16, 1930.    J. F. H. DOUGLAS    1,785,515
DYNAMO ELECTRIC MACHINE
Filed June 28, 1926    3 Sheets-Sheet 1
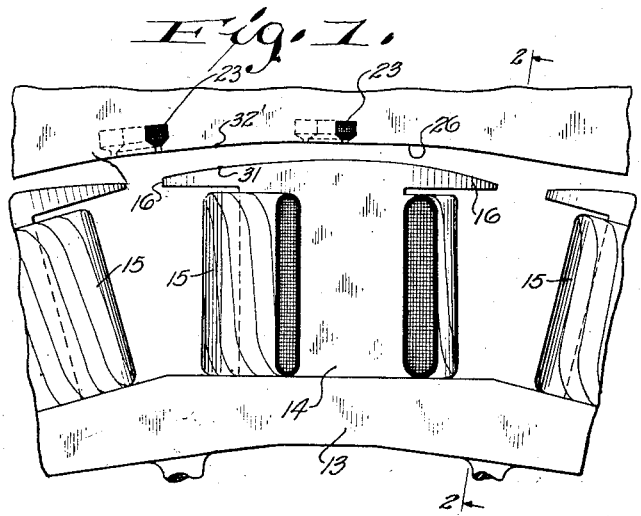
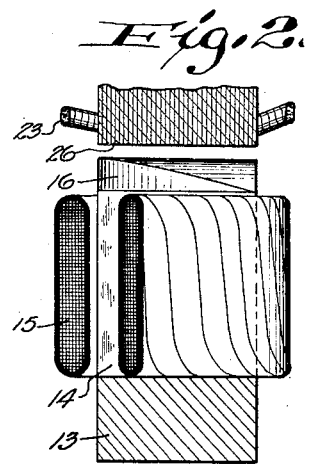
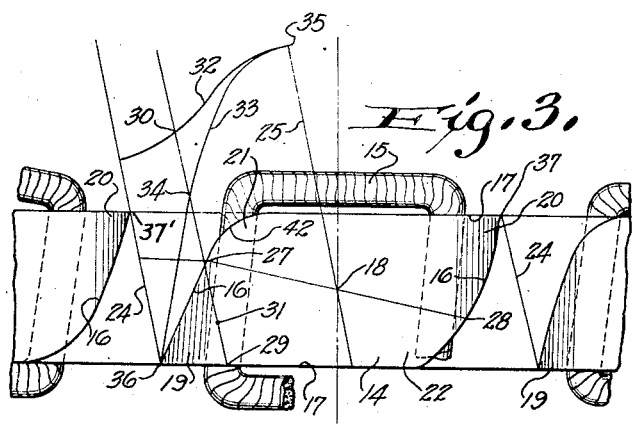
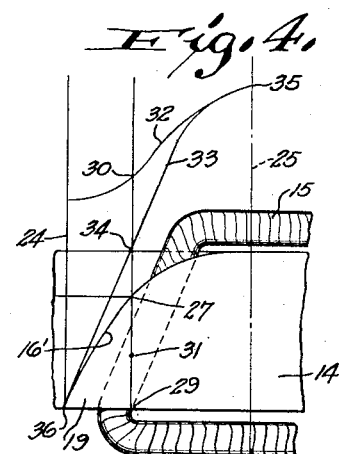
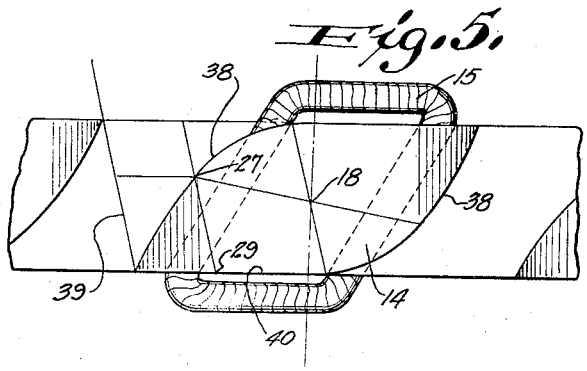
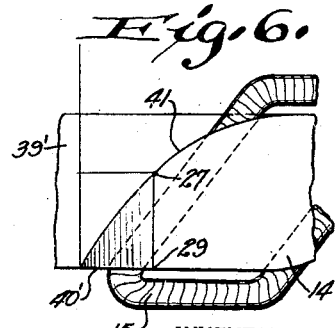
INVENTOR.
John F. H. Douglas
BY Charles J French
ATTORNEYS Dec. 16, 1930.   J. F. H. DOUGLAS   1,785,515
DYNAMO ELECTRIC MACHINE
Filed June 28, 1926   3 Sheets-Sheet 2
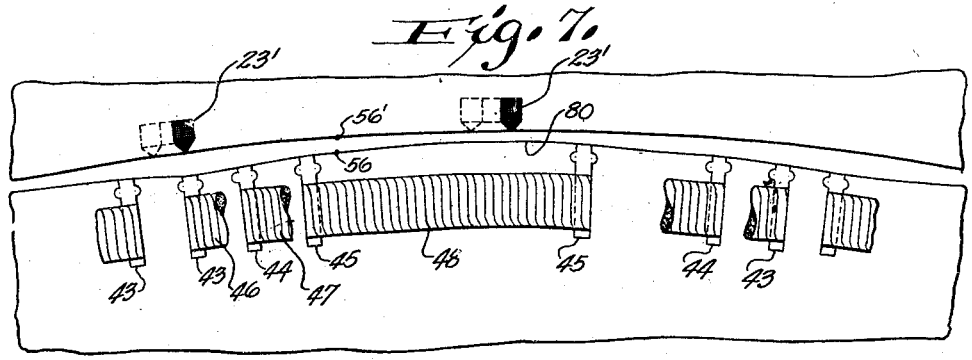
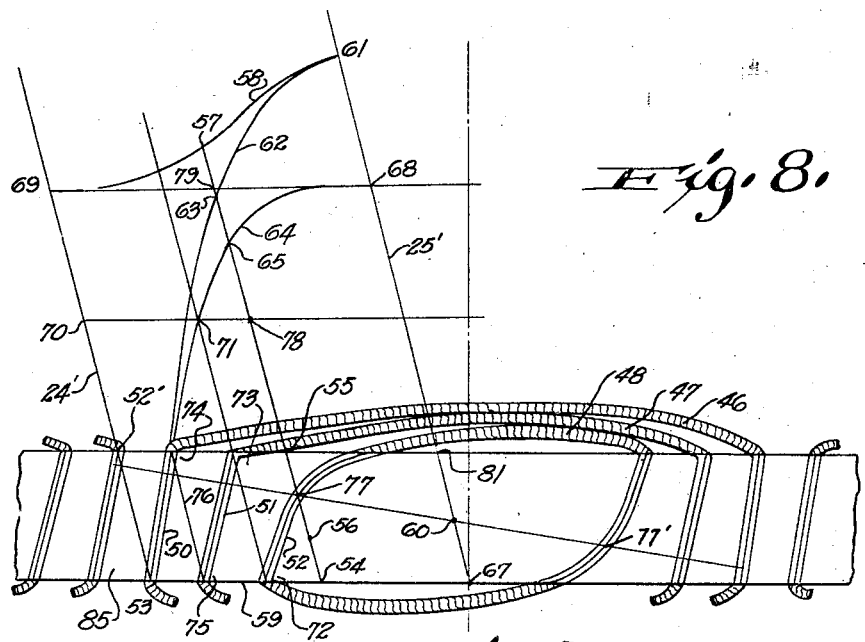
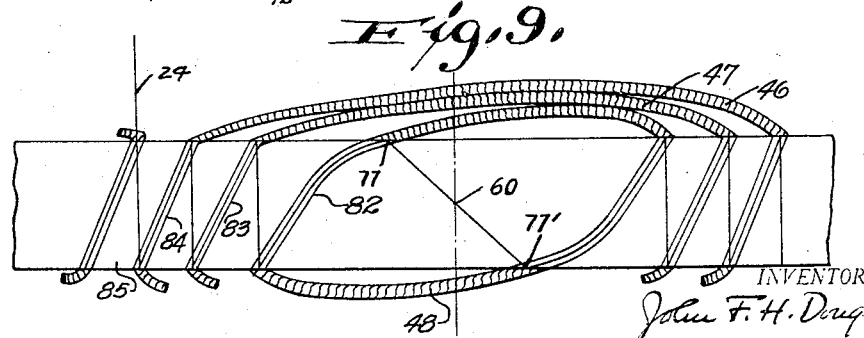
INVENTOR.
John F. H. Douglas
BY
Charles French
ATTORNEYS Patented Dec. 16, 1930

1,785,515

UNITED STATES PATENT OFFICE

JOHN F. H. DOUGLAS, OF MILWAUKEE, WISCONSIN, ASSIGNOR OF ONE-HALF TO EDWARD W. KANE, OF MILWAUKEE, WISCONSIN

DYNAMO-ELECTRIC MACHINE

Application filed June 28, 1926. Serial No. 119,135.

The invention relates to dynamo electric machines of synchronous type.

The object of the invention is to provide a pole shoe or pole face for synchronous dynamo electric machines that will improve the operating characteristics of such machines by generating more perfectly than heretofore a sinusoidal wave of electromotive force. More particularly this is accomplished by giving the poles of a salient pole machine or the different portions of the poles of a distributed winding machine a rhomboidal shape so that the length of the pole, measured parallel to the armature conductors, is varied in such a manner that a substantially sinusoidal wave of induced electromotive force is produced in each conductor. By rhomboidal I mean a shape approximating a rhombus, that is, a figure with point symmetry about its center, with four main corners, two acute and two obtuse. It is to be understood that by this definition I do not exclude figures with curved sides provided they are symmetrical in shape about the center of the pole, nor figures made up with sides having broken lines provided the poles are of a generally rhomboidal shape.

The method of shaping the pole sides so that the induced electromotive force is approximately sinusoidal consists in forming the shape of this side from a series of points each of which is determined by the terminus of a line measuring the active length of the pole, these lines being proportional to the desired wave of electromotive force and proportional to the average gap or clearance from the pole opposite the conductor and the equivalent smooth core armature surface hereinafter mentioned, these lines or lengths being always measured from a point on the edge of the pole which is substantially parallel to the direction of motion of the rotor, and in a direction parallel to the armature conductors. This involves, chiefly, giving the portions of the edge of the pole or the sides on one pole an inclination greater nearer the center of the pole than at the pole tips. A further improvement results when the curvature of the pole edge nearest the center is greater than that adjacent the pole tip. The best results are obtained when the pole edges are carefully laid out in curves by the method hereinafter described.

The poles are preferably shaped so that one pole tip is near the front and the diagonally opposite tip near the back of the armature and adjacent poles are preferably so arranged that the adjacent pole tips are separated from each other, one being on the front the other on the back side of the armature, whereby to reduce magnetic leakage, avoid loading some of the armature laminations with excess of magnetic flux while others are seriously underloaded, and also eliminate any tendency for magnetic flux to pass from one lamination to another.

The surfaces of the pole face are preferably shaped to cylindrical forms, the shape being determined by convenience of manufacture. The preferred form is that of a circular cylinder with its elements parallel to the shaft of the machine but slightly eccentric with the armature so that the gap at the pole tips is from two to two and one-half times that at the pole center, but good results may be obtained with concentric poles or chamfered poles. The preferred shape is easily machined and leads to more nearly rectangular poles and flat coils.

The poles are shaped with reference to the armature edges and a line parallel to the armature conductors as co-ordinate axes, the line parallel to the armature conductors becoming a line midway between adjacent poles. The distance between poles is determined in the usual manner by the frequency, speed and armature diameter. They may be designed, therefore, to fit armatures with conductors with any amount of skew. Poles with the same cylindrical pole face surface for use in armatures of the same diameter and the same air gap differ in the shape of their pole edges, but when referred to the axes mentioned above they are represented by the same equation or function so that mathematically they are of the same form, the axes of reference being determined by the armature with which they are used in combination and laid out by the same rule.

The invention further consists in the several features hereinafter set forth and more particularly defined by claims at the conclusion hereof.

In the drawings Fig. 1 is a detail end elevation view of a portion of a dynamo electric machine having salient poles embodying the invention, some of the coils and conductors being shown in section;

Fig. 2 is a detail sectional view taken on the line 2—2 of Fig. 1;

Fig. 3 is a plan view of the pole shown in Fig. 1 wherein the surface of the pole is eccentric with the armature and used with an armature having skew conductors;

Fig. 4 is a partial plan view of a pole embodying the invention having its surface eccentric with the armature for use with an armature whose conductors have a zero skew;

Fig. 5 is a view similar to Fig. 3 of a pole embodying the invention having its pole surface concentric with an armature having skew conductors;

Fig. 6 is a partial plan view of a pole embodying the invention having a pole surface concentric with an armature whose conductors have a skew of zero;

Fig. 7 is an end elevation of a pole of a synchronous electric machine embodying the invention with more than one field coil per pole;

Fig. 8 is a plan view of the pole shown in Fig. 7;

Fig. 9 is a view similar to Fig. 8 wherein the poles embodying the invention are associated with an armature whose conductors are without skew;

Figure 10:
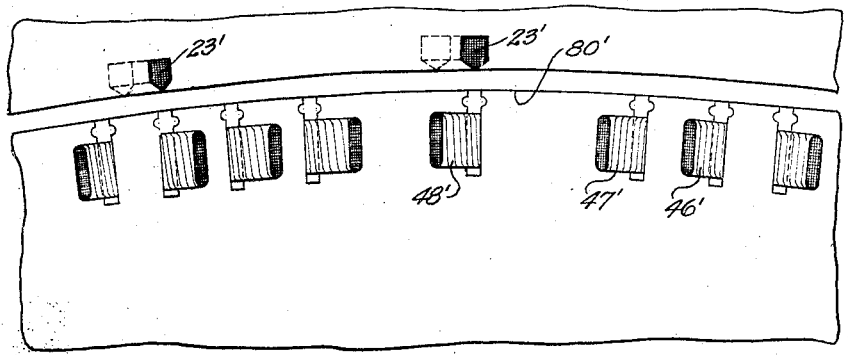
Fig. 10 is an end elevation of a pole of a synchronous electric machine embodying the invention having more than one field coil per pole and a surface that is concentric with an armature for skew conductors.

The drawings show the invention used in connection with a dynamo electric machine having a distributed armature winding, it being best adapted to wave form, but it is to be understood that the field construction hereinafter described and embodying the invention can be used with any armature winding of desirable characteristics.

In Figs. 1, 2 and 3, illustrating the general case of a salient pole type of machine with eccentric pole surfaces and skewed armature conductors, the numeral 13 designates the revolving yoke upon which the poles 14 are mounted and secured in any suitable manner, and 15 the field coil for each pole. These poles have edges 16 and sides 17 shaped in plane to form a rhomboidal figure having point symmetry about the pole center 18, with four main corners formed by the sides, the corners 19 and 20 being acute and the corners 21 and 22 being obtuse.

In Figs. 1 to 3, inclusive, a skewed armature conductor 23 is shown in two positions, one of these being over the center of the pole and the other midway between the poles, and in Fig. 3 the lines 24 and 25 designate the projections of these conductor positions on the developed pole surface.

The pole tips 19 and 20 are respectively the leading or trailing tips, depending upon the direction of rotation of the member carrying the field coils. The pole tips 19 are opposite the front and the pole tips 20 are opposite the back edges of the armature, and adjacent tips are separated. The armature surface 26 shown is the equivalent smooth core armature surface from which, for design purposes, it is customary to make computations. This surface is assumed to have the same magnetic characteristics as the actual toothed surface but is a smooth core surface and lies a predetermined distance back from the tips of the actual teeth. The distance of this smooth core surface from the actual tips of the teeth is found by the product of the actual air-gap and a term known as the "air-gap coefficient".

This term "air-gap coefficient" is also known as "extension coefficient for effective air-gap in toothed armatures", and under these names is referred to by C. C. Hawkins in his book "The Dynamo", Pittmann's 1922, page 492 and also in the index list of symbols, page XVIII.

While this extension coefficient or air-gap coefficient, as computed by the charts in the authority cited, varies to some extent, the distance from the equivalent smooth core armature surface 26 to the actual tips of the teeth is substantially constant so that we have therefore, shown the surface 26 as a circular cylinder having as its axis the center of the shaft.

In Fig. 3 where the numeral 27 designates any point on one of the pole edges, a line drawn through this point and the pole center 18 intercepts the opposite pole edge at the point 28, and said points 27 and 28 are equidistant from the pole center. Any other points along the pole edges located in this manner will also be equidistant from the center. It will be noted from Fig. 3 that the edges of adjacent poles are so placed relative to each other as to have the point of the pole tip 20 on a line passing through the point of the pole tip 19 of the adjacent pole, as represented by the line 24, which represents the skewed conductor. Because of this symmetry of the poles and their rhomboidal shape, together with the alinement of the pole tips, the various armature laminations are uniformly loaded with magnetic flux so that no lamination has to carry much in excess of the average lamination and so that there is little tendency for magnetic flux to pass from one lamination to another. These features help to reduce heating of the armature and prevent saturation. Because the adjacent pole edges are separated the leakage flux is reduced.

In Fig. 3 the length of the line between the points 29 and 30 represents the magnetic density opposite the point 31 midway between 27 and 29, and the curve 32 represents by its ordinates the manner in which the magnetic density varies under its pole face. The curve 32 at each point of the pole varies inversely as the distance from a point such as 32′ to a point 31′ of the pole surface opposite 26, Fig. 1. Thus, if the poles are eccentric with the armature and the gap largest at the pole edges the flux density will be largest at the center and least at the pole edges. The curve 32 is laid out so that at every point the distance 29—30 is varied inversely as the gap 31—32′. The curve 32 is laid out with reference to the line 24 and the nearest side 17 as co-ordinate axes. The line 33 is the desired wave of induced electromotive force in the conductor, a sine wave, or substantially a sine wave, and 34 is the intersection of this line with the line 30—29. The curve 33 is laid out so that its maximum ordinate 35 agrees with that of the curve 32. The edge 16 of the pole 14 is drawn so that the distance 27—29 is to 36—37′ as 29—34 is to 29—30. In this way the active length of pole represented by the line 27—29 measured parallel to the armature conductor represented by the line 24 or 25 is varied directly as a sine wave and inversely as the flux density 30—29 opposite an average point 31 on the conductor 27—29.

In Fig. 4 the pole edges 16′ are laid out in a manner similar to Fig. 3 and the construction lines with the points are similarly numbered. The only point of difference lies in the fact that the skew of the armature conductors is zero and consequently the axis 24 is perpendicular to the lower side of the pole.

In Fig. 5 the pole edge 38 is shown of sinusoidal shape referred to the axes 39 and 40. By "sinusoidal shape" referred to oblique co-ordinates I define a shape in which the ordinate from a given point on the curve measured parallel to the oblique axis of the ordinate varies as the sine of the abscissæ measured parallel to the axis of the abscissæ, in particular in Fig. 5 the distance 27—29 varies as the sine of the distance of 29 to the intersection of 39 and 40. This meets the condition where the density between the poles and the armature is uniform and the pole surface concentric with that of the armature. The axes 39 and 40 are oblique because the armature conductors are skew. The manner of obtaining the curved edge is the same as that in Fig. 3 and hence the construction lines have not been shown in detail.

The pole shown in Fig. 6 with the pole edge 41 differs from that in Fig. 5 only in that it is sinusoidal with respect to rectangular axes 39′ and 40′. It is obtained where the pole surface is concentric with the armature and the armature conductors are zero skew. The pole edge 41 is laid out in the same manner as that of Fig. 3.

Of the forms disclosed in Figs. 3 to 6, inclusive, that of Fig. 3 has the most conveniently shaped core and coils and when the edges are laid out according to the above rule very close approximations to sine waves of induced electromotive force will be obtained, though it will be understood that results superior to those at present obtained in the art will be had if the pole edges are approximated with two or more chords, arcs, or arcs and chords, so as to obtain a pole of a substantially rhomboidal shape having point symmetry and with the angle that these edges make with the projection of the armature conductor greater at the point nearer the pole center as, for instance, at the point 42 in Fig. 3, than at a point near the pole tips as 36 and 37.

Figs. 7 to 12, inclusive, represent different cases for machines having a pole made up of different pole portions with the distributed winding between said portions. In these figures the portions of the pole have edges here taken as located at the centers of the slots 43, 44 and 45, in which the coils 46, 47 and 48 are placed, and the actual pole edges are designated by the numerals 50, 51 and 52.

In Fig. 8, showing a developed pole surface, the lines 24′ and 25′ are the projections of the armature conductor 23′, 24′ being interpolar and 25′ being under the pole center, and 52—53 the distance between opposing pole tips. The line 54—55 represents any position of the armature conductor. The point 56 is a point on the conductor where the air gap has an average value. The line 54—57 is the prolongation of 54—55 and the distance 54—57 is made equal on a convenient scale to the reciprocal of the air gap at the point 56 or the flux density which would be produced by the action of the outer coil alone.

The line 58 is the locus of the points 57, that is, at all points its ordinate or distance from the base line 59 measured parallel to 24′ is the reciprocal of the air gap between points on the pole surface and the adjacent equivalent smooth armature surface, or equal to the density produced opposite the particular point, as, for instance, 56, by the outer coil 46 alone. The maximum density in the gap or reciprocal of the air gap under the center 60 of the poles is the ordinate of the point 61. Curve 62 is a sine wave of desired electromotive force to be induced in the conductor and in position 54—57 of the conductor the line 54—63 represents by its length the value of the electromotive force induced in the conductor. The scale of volts is most conveniently chosen so that the maximum point coincides with the maximum of the curve 58 at the point 61. Curve 64 is laid out so that the distance of its intersection with 54—57, namely, at point 65, is located from point 54 by a distance which is varied in the ratio of 54—63 to 54—57. This curve represents the necessary length of pole to secure a sine wave of electromotive force with the outer coil 46 alone excited.

To induce the maximum electromotive force 67—61 with the use of the outside coil alone a pole length of 67—68 would be needed. With three equal coils, as shown, only one-third of this length is needed, the scale or curve 64 is taken such that the distance 67—68 is three times the core length desired 67—81. In general, if the ampere turns of the three coils are different the maximum ordinate of the curve 64 is located on a line 68—69 parallel to the line 59 and cutting line 24' at the point 69 such that the distance 53—52', 52'—70 and 70—69 are respectively proportional to the ampere turns of the coils 46, 47 and 48. If there are other than three coils the construction is modified in a manner which will be apparent to one skilled in the art. In Fig. 8 all three coils are equal and the distances 53—52', 52'—70 and 70—69 are equal. The line drawn through the point 70 parallel to the line 59 intersects the curve 64 at the point 71.

Corners 72 and 73 formed by the center lines for the slots 44 and 45 are located where the line drawn through the point 71 and parallel to conductor 24' intersects the center line through the slots, and corners 74—75 are located at the intersection between a line 76 and the center lines of the slots 50 and 51, the line 76 intersecting the curve 64 at the corner 74.

The line 54—65 represents the length of pole required to induce the voltage 54—63 with the action of outer coil 46 alone. This is made up of three portions 54—55, 55—78, and 78—65 of which 54—55 is actually supplied by coil 46, and the length 55—78 is supplied by coil 47 acting on 54—55 and the length 78—65 is supplied by coil 48 acting on 54—77. The length of the conductor exposed to portions of the pole face 80, that is, exposed to magnetism produced by the inner coil 48, is to the line 54—55 as 78—65 is to 78—79. In case the three coils are equal the pole edge 51 is parallel to the arc 74—71 and the pole edge between points 72 and 81 is substantially parallel to the curve 71—68. Thus the plotting of the curve 64 and the projection of proportional parts thereof parallel thereto upon the pole surface gives the desired configuration of the edge of the pole portions for the distributed winding type of machine. The case of a distributed winding type with an eccentric pole, the skew of the armature conductor being zero, is shown in Fig. 9, and the pole edges 82, 83 and 84 are identical with those in Fig. 8 except that they are referred to rectangular axes.

It is to be noted that the surface 85 between poles in a machine of this type is not magnetized as it is not surrounded by any coil and therefore may be made of non-magnetic material.

Figure 11:
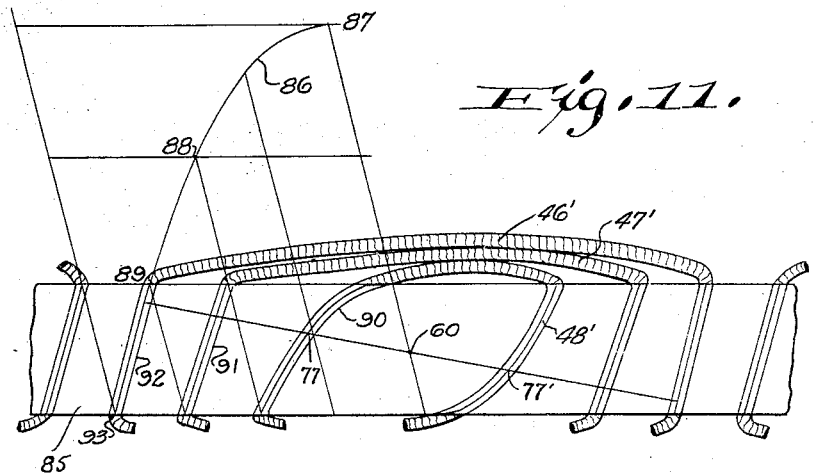
Fig. 11 is a plan view of the pole shown in Fig. 10.

In Fig. 10 pole surface 80' is concentric with the armature surface and the energizing coils are 48', 47' and 46', and Fig. 11 shows the appropriate shape of the slots and pole edges for this case in which the magnetic density under each portion of the pole face is substantially constant.

Figure 12:
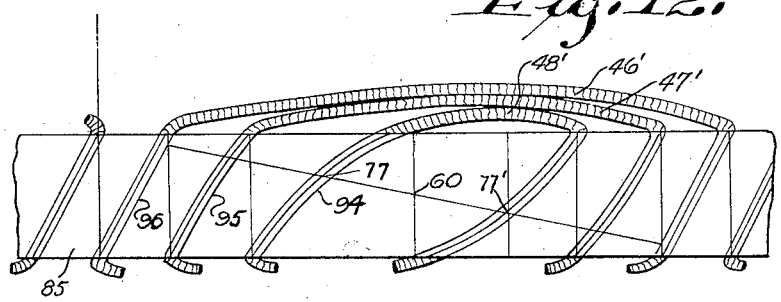
Fig. 12 is a view similar to Fig. 11 wherein the armature conductors have a zero skew.

The curve 86 in Fig. 11 is laid out similar to the curve 64 in Fig. 8 with the reference points 87, 88 and 89, the pole edge 90 being parallel to that part of curve 86 between points 88 and 87, 91 between the points 89 and 88, and 92 the projected part of the curve along the line 89—93, and in this instance the curve is truly sinusoidal. Fig. 12 is a special case of Fig. 11 of concentric poles with armature conductors for a zero skew and the pole edges are obtained in a similar manner to those of Fig. 8 and Fig. 11 and are noted as 94, 95 and 96.

Of the forms shown in Figs. 8, 9, 11 and 12, the form shown in Fig. 8 is preferable in that the slots and coils have most nearly a rectangular shape but good results may be had with any amount of skew and irrespective of whether the pole is concentric or eccentric with the armature surface. Best results will be obtained if the curves 58, 62 and 64, 50, 51 and 52 are carefully laid out but good results will be obtained if the edges 50, 51 and 52 are proximated with chords or arcs. The general characteristics of the pole shapes disclosed are poles the several portions of which are rhomboidal in shape and with the inclination of the sides increasing toward the pole center. Thus edge 52 has a greater inclination than edge 51 and thus in turn a greater inclination than edge 50.

These poles are preferably made of steel castings or forgings which may be machined to the desired shape by known methods though the invention is not to be limited to the use of these materials for forming the poles.

The choice of a proper type of armature winding is important in any synchronous alternating current machine. Although constituting no part of my invention, a designer would choose such a winding as would still further improve the wave form.

At no load the pitch and distribution factors determine the ratio of the resulting harmonic in the voltage wave to that which would exist in the voltage wave were there no distribution. These factors are complicated functions of the number of slots, number of phases, coil pitch, and order of harmonic. Their values are, however, well known and tabulated in the Standard Handbook for Electrical Engineers. In many cases it is possible, by a skilful choice of number of slots and coil pitch, to greatly mitigate or reduce one, two or even more harmonics present because of poor pole design. However, in no case are these factors greater than unity and in no case will the harmonic in the voltage wave be more prominent than in the original flux wave. There is, therefore, a great help to designers to be able to shape the poles so that all unfavorable harmonics are greatly reduced for then the limited facilities afforded by armature coil and slot pitch selection can be applied to still further reduction of residual harmonics.

The effect of armature currents is generally such as to introduce harmonics into the wave form. In the case of machines without salient poles this is generally quite small. The effect is smaller when the number of armature coils is increased but in the case of salient pole machines the wave form of flux contains harmonics under load conditions of larger amounts than at no load. In particular a large third harmonic is introduced.

In machines of the type herein described the effects of the current in the armature are much the same. The wave form will not improve under load but an analysis shows that the harmonics introduced are somewhat smaller when the poles are rhomboidal owing to the fact that the armature conductors act on amounts of polar iron varying in a gradual rather than in an abrupt manner. The wave form under load provided by the construction herein is better than on previous machines in that the flux components produced by both armature and field wave are improved. However, the harmonics due to the armature coils are relatively small compared to the harmonics produced by the field coils and the present invention is more particularly designed to remedy the defects of the prior field coil arrangement.

I have shown in these last-mentioned figures a synchronous machine with twenty-four revolving poles with one or with three field coils per pole, however, it is to be understood that any number of poles may be used associated with any number of field coils per pole in a machine of the revolving or field type without departing from my invention, and that various other modifications may be made within the scope of the appended claims.

What I claim as my invention is:

1. In a synchronous dynamo electric machine, the combination with the armature conductors, of poles having pole faces of rhomboidal shape with their edges inclined relative to said armature conductors, the inclination of the pole edges relative to the conductors being greater at points nearest the pole center line than at points near the pole edges.

2. In a synchronous dynamo electric machine, the combination with the armature conductors, of poles having pole faces of rhomboidal shape with point symmetry about their centers and with their edges inclined relative to said armature conductors, the inclination of the pole edges relative to the conductors being greater at points nearest the pole center than at points near the pole edges.

3. In a synchronous dynamo electric machine, the combination with the armature conductors, of poles having pole faces of rhomboidal shape with their edges inclined relative to said armature conductors, the inclination of the pole edges relative to the conductors being greater at points nearest the pole center line than at points near the pole edges, each pole having a pole tip near the front and an oppositely disposed pole tip near the rear edge of the armature.

4. In a synchronous dynamo electric machine, the combination with the armature conductors, of poles having pole faces of rhomboidal shape with their edges inclined and curved relative to said armature conductors, the inclination and curvature of said edges increasing as the distance of the pole edge increases from the pole tip.

5. In a synchronous dynamo electric machine having divided pole portions and more than one exciting coil for each pole, pole faces, the divided portions of which are of rhomboidal shape, the inclination of the sides of an inner pole portion being greater than that of an outer pole portion.

6. In a synchronous dynamo electric machine, the combination of an armature and pole surfaces concentric thereto, each of the poles having its sides laid out in substantially sinusoidal arcs whose ordinates have as axes the front edge of the poles and the projection of an armature conductor midway between the poles on a developed pole surface.

7. In a synchronous dynamo electric machine, the combination with an armature, of poles having cylindrical surfaces and with more than one exciting coil per pole dividing the pole into a plurality of separated pole portions, each pole portion being of rhomboidal shape and having its adjacent edges so shaped that the product of length by flux density opposite the space between the pole portions, as the armature conductor moves in relation to the pole faces, increases sinusoidally.

8. In a synchronous dynamo electric machine, the combination of an armature and poles cooperating therewith and having cylindrical pole surfaces, each of the poles having a face of rhomboidal shape so formed that the length of the several elements of the pole face measured parallel to the armature conductor is varied directly as a sine wave and directly as the distance from their several mid-points and the equivalent armature surface.

In testimony whereof, I affix my signature.
JOHN F. H. DOUGLAS.